United States Patent
Hentschel

[11] Patent Number: 5,246,651
[45] Date of Patent: Sep. 21, 1993

[54] METHOD OF MANUFACTURING COLUMNAR SHAPED PIECE

[75] Inventor: Martin Hentschel, Mainbernheim, Fed. Rep. of Germany

[73] Assignee: Real GmBh, Mainbernheim, Fed. Rep. of Germany

[21] Appl. No.: 774,760

[22] Filed: Oct. 9, 1991

[30] Foreign Application Priority Data

Oct. 27, 1990 [DE] Fed. Rep. of Germany ....... 4034213

[51] Int. Cl.$^5$ .................. B29C 53/72; B29C 47/88
[52] U.S. Cl. ................... 264/108; 156/244.11; 264/45.5; 264/211.21; 264/310; 264/323; 264/348; 264/DIG. 69; 264/297.3; 425/319; 425/325
[58] Field of Search .............. 156/244.11, 149; 264/46.2, 323, DIG. 69, 108, 103, 178 R, 45.5, 211.21, 310, 348, 297.3; 425/319, 377, 325, 381

[56] References Cited

U.S. PATENT DOCUMENTS

| | | | |
|---|---|---|---|
| 2,414,097 | 1/1947 | Garvey et al. | 264/108 |
| 3,111,739 | 11/1963 | Horton et al. | 425/380 |
| 3,407,440 | 10/1968 | Myers, Jr. | 425/319 |
| 3,480,569 | 11/1969 | Chappelear et al. | 264/75 |
| 3,500,541 | 3/1970 | Hammerlund et al. | 425/377 |
| 4,154,893 | 5/1979 | Goldman | 264/327 |
| 4,187,352 | 2/1980 | Klobbie | 264/323 |
| 4,738,808 | 4/1988 | Hammer et al. | 264/323 |
| 5,032,072 | 7/1991 | Heuschkel | 264/297.2 |

FOREIGN PATENT DOCUMENTS 3341438 6/1985 Fed. Rep. of Germany.

Primary Examiner—Jeffery Thurlow
Attorney, Agent, or Firm—Sprung Horn Kramer & Woods

[57] ABSTRACT

A method of manufacturing a columnar shaped piece formed of a thermoplastic matrix with ancillary pieces of a non-creeping hard material embedded therein and cemented by the plastic matrix. The ancillary pieces are essentially overlapping slabs which are substantially parallel to one another and the axis of the columnar shaped piece. Molten thermoplastic blended with solid slabs is extruded in the form of a billet into one end of an elongate mold and rotated around the inner surface of the mold. The extrusion continues until the inner surface is uniformly covered with constituents of the billet.

4 Claims, 4 Drawing Sheets

METHOD OF MANUFACTURING COLUMNAR SHAPED PIECE

BACKGROUND OF THE INVENTION

The invention concerns a columnar shaped piece comprising a thermoplastic matrix with ancillary pieces of a non-creeping hard material embedded therein and cemented by the plastic matrix.

A columnar shaped piece of the aforesaid type is generally known. The ancillary pieces embedded therein and cemented by the plastic matrix consist of essentially spherical mineral dyes. They provide the piece with color and have only a very slight effect on the piece's mechanical properties, especially its bending resistance.

A method is known for the manufacture of columnar shaped pieces wherein a thermoplastic is melted in an extruder, blended with ancillary pieces of non-creeping material, introduced into a mold and shaped into a piece therein, and solidified by cooling. The ancillary pieces in this method are particles of pigment. They dictate only the color of the resulting columnar-shaped piece.

SUMMARY OF THE INVENTION

A principal object of the present invention is to provide a columnar shaped piece that differs from the known piece of this type due to its improved mechanical properties and especially to its improved bending resistance.

A further object of the present invention is to develop a method of manufacturing which produces columnar shaped pieces with definitely improved strength.

These objects, as well as other objects which will become apparent in the discussion that follows, are achieved, in accordance with the present invention, in that the ancillary pieces are essentially overlapping plates or "slabs" and essentially parallel with one another and the longitudinal axis of the columnar shaped piece. This design definitely reduces the tendency of the thermoplastic material that constitutes the matrix to creep subject to long-term stress and allows the columnar piece to be employed as a structural element.

It has been demonstrated especially practical for the slabs to be essentially the same size longitudinally and transversely. This feature will help ensure that the slabs overlap like roofing tiles along and around the columnar piece. All mechanical properties, especially bending resistance, resistance to compression, and resistance to buckling will be definitely improved along and around the piece.

The slabs should if at all possible be 0.2 to 0.4 as thick as they are long and wide.

This feature will help ensure orientation of the slabs parallel to one another and to the axis of the piece while it is being manufactured by extruding a blend.

The slabs can be duroplastic, preferably reinforced with fiber. Materials of this nature are widely employed in the manufacture of automobile bodies in the form of extensive surfaces. It has up to now been impossible to recycle them and they are accordingly cheap and plentiful. They can easily be broken down into slabs of the size needed for the present application with mechanical breakers or screen mills. The process is accompanied by the advantage that the edge of the resulting slabs is irregular, so that the ends of any fibers included therein will extend beyond it. This characteristic improves bonding the slabs into the thermoplastic matrix. Another advantage is that plastic resins and thermoplastics have essentially the same coefficient of linear heat expansion, and fluctuations in the temperature at which the piece is used cannot lead to interior stress.

The piece should have embedded in it 10 to 40 slabs: in practical terms 20 to 30% of its weight in slabs. It is within the latter range in particular that the slabs can easily be embedded in the piece arrayed mutually overlapping and parallel and paralleling the axis of the piece. Their mechanical properties are accordingly able to optimally complement those of the thermoplastic matrix to the extent that severe mechanical stress can be accommodated and that attenuation will be satisfactory, which is a major advantage in terms of impact absorption. Heat expansion and shrinkage on the part of the columnar piece cannot destroy the adhesion between the embedded slabs and the plastic matrix. An especially satisfactory mechanical resistance on the part of the piece and in particular definitely improved bending and buckling resistance in relation to weight can be attained when the slabs are embedded closer together at the periphery of the piece than they are at the core. It has also been demonstrated to be advantageous for the plastic at the core of the piece to be at least partly expanded.

In the manufacturing method in accordance with the invention, the molten thermoplastic is blended with ancillary pieces in the shape of slabs; the molten thermoplastic with the slabs in it is introduced in the form of a flexible paste-like strand or "billet" that rotates around a horizontal axis into one end of the mold and, inside the mold, is brought into contact with its inner surface along the circumference; and the aforesaid introduction continues until the inner surface is continuously and uniformly covered with constituents of the billet. Various forces act on the billet while it is being introduced into the mold. The diameter of the billet is always shorter than that of the mold. Its forward end will accordingly, and due to its satisfactory plastic deformability subsequent to introduction into the mold, sag and come into contact with the latter's inner surface, resulting in a certain level of mutual adhesion. The billet will accordingly begin to rotate as well as advance. The subsequently introduced constituents of the billet will accordingly constantly and continuously be brought into contact along the circumference inside the mold, resulting in mutual adhesion, initially with the inner surface and then with the already deposited constituents of the billet until the available space between the deposited constituents and the outlet from the extruder is completely occupied. The billet, as it continues to enter in the same mode will now occasion a relative displacement and replacement of the constituents already deposited in the mold to the extent that the original adhesion between the billet and the inner surface will be destroyed and the original billet will be transformed into the piece. The rear end of the piece will accordingly be constantly augmented with new subsidiary sections while its forward end travels through the columnar mold and eventually comes into contact with the mold's forward wall. It is of advantage to position in this vicinity a sensor that will emit a signal when the new piece is finished. The piece will now be cooled to solidify it, with shrinkage decreasing the diameter to produce a gap at the inner surface of the mold. The piece will accordingly be extremely easy to remove with a compressed fluid, air for example.

The slabs in the resulting pieces are surprisingly continuously mutually overlapping, extending essentially parallel to one another and to the piece's axis. The slabs are surrounded on all sides by the plastic matrix and can accordingly not be detected at the surface of the piece. The piece's mechanical properties are in any case significantly improved.

The method in accordance with the invention is especially appropriate for processing waste plastic into new products. The waste must be broken up small and thoroughly mixed to be smoothly supplied to the extruder. In addition to the thermoplastic constituents, those based on polyolefins and polyvinyl chloride for example, the blend can contain slabs of such a non-creeping hard material as fiber-reinforced epoxide resin. The slabs can measure approximately 5 to 10 mm longitudinally and transversely and be 0.5 to 3 mm thick. Dyes of conventional composition can be included when necessary. The starting materials can be of any form—moldings and imprinted or unimprinted sheet for example.

The extruder in the generic device has in accordance with the invention only one screw, which is coaxial with the outlet and the mold. Ideally, the rotation will be superimposed over the force that expels the billet. The ratio between the open diameter $D_1$ of the outlet and the free diameter $D_2$ of the extruder should preferably be between 0.3 and 0.8, provided that the diameter $D_1$ of the outlet is at least twice as long as the longest slab.

It has been demonstrated to be of advantage for the same reason for the outlet to be circular. This feature promotes the desired rotation of the billet around its axis. The ratio between the length and the diameter of the outlet should also be as small as possible and should not exceed 1.

The extruder should if possible not have any degassing device. The bubbles of air or gas expelled from such an embodiment along with the billet are surprisingly not uniformly distributed over the product's cross-section. They are confined to the vicinity of the core, which is accordingly surrounded by a completely non-porous outer zone. The width of this zone is approximately constant over the circumference, and the zone is optically distinctly different from the core. No blowholes can be observed in the vicinity of the surface. The piece's surface can, rather, be of any texture, which is a significant advantage from the aspect of esthetics. The cross-sectional design hereintofore described also means particularly satisfactory buckling and bending strengths in terms of the product's weight.

In addition to the aforesaid type of mold, at least two additional molds can be associated with one extruder, each mold traveling by the extruder's outlet and stopping in front of it as desired. This approach considerably accelerates the manufacturing process in that one mold is always in the emptying position, one in the charging position, and one in the cooling position.

The individual molds in such an embodiment can revolve in a device that rotates around an axis paralleling the axis of the extruder. This system will simplify the engineering of the drive mechanism that moves the separate molds in relation to one another.

The rotating device can be immersed at least up to its axis in water, with the extruder positioned above the surface of the water next to a receptacle for the pieces. Such a design will be compact and space-saving and will provide an especially satisfactory potential for completely automating manufacture of the products.

A columnar piece in accordance with the invention can have almost any cross-section desired. Not only circular but stellate and polygonal cross-sections can easily be created. The edges of rectangular cross-sections can be of any shape—with convex or concave curves for example. It accordingly becomes possible to produce what is called profile board, which has tongues and grooves that allow it to be joined together into large surfaces, to almost zero tolerance. The ratio of the depth to the width of such pieces can easily be between 1:4 and 1:6.

The mold employed in the method in accordance with the invention can be very simple, a thin-walled cylinder of metallic material for example. It is practical not to cool the mold with an ancillary coolant until its inner surface is uniformly wet with constituents of the billet. This approach will ensure that the product will exhibit a consistent inner and outer design over its total length. The product can then be cooled by active means, by directly immersing the mold and its contents in water for example. The product's non-porous outer zone will ensure continuous cooling and solidification of the areas that determine dimensional stability. The piece can soon be removed from the mold, which is a major advantage from the aspect of economics.

The preferred embodiments of the present invention will now be described with reference to the accompanying drawings.

DETAILED DESCRIPTION OF THE PREFERRED EMBODIMENT

Figure 1:
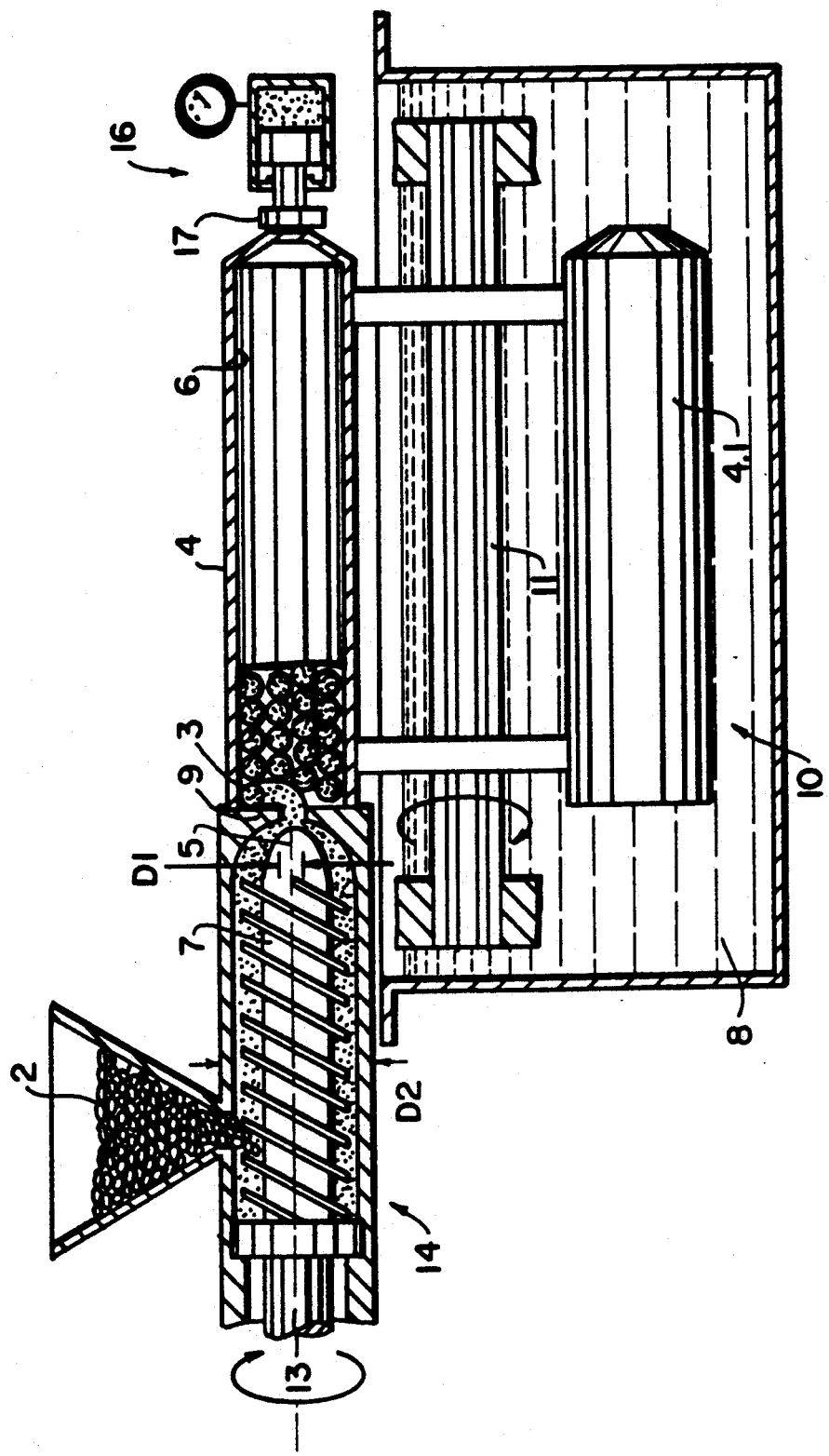
FIG. 1 is a schematic longitudinal section through a preferred embodiment of a device for carrying out the method in accordance with the invention.
Figure 2:
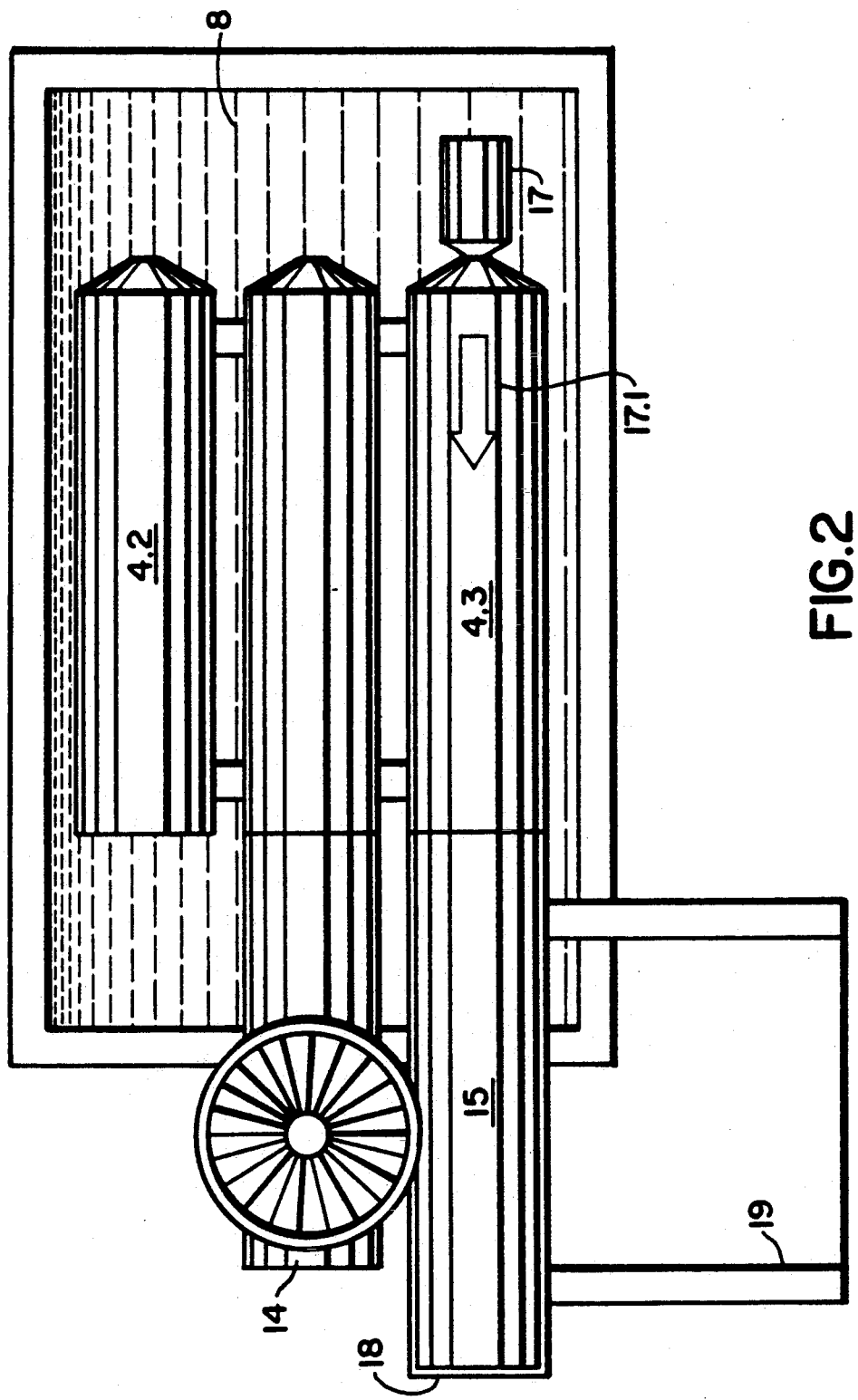
FIG. 2 is a top view of the device illustrated in FIG. 1.

The device illustrated in FIGS. 1 and 2 consists of an extruder 14 positioned above a tub 8 of water.

The extruder 14 has a housing accommodating a screw 7 that rotates on a driveshaft 13. A blend 2 enters the extruder from a hopper at the left, and the threads around screw 7 force the material constantly to the right. The housing has an inside diameter $D_2$ that decreases to a diameter $D_1$ at the output end in the vicinity of an outlet 9. The blend 2 of granulated thermoplastic and 20 to 25% ancillary pieces by weight in the form of slabs 2.5 mm thick and 5 to 10 mm long and wide of cotton-reinforced epoxide resin enters from the hopper at the left but can accordingly not travel through extruder 14 unaltered. It is exposed to thorough kneading, resulting in melting of the thermoplastic particles and thorough distribution, bonding, and wetting of the slabs as it travels through the device. The ratio of diameter $D_2$ to diameter $D_1$ is approximately 2.5. The plastic leaving outlet 9 is accordingly in the form of an essentially homogeneous and viscous billet rotating and traveling toward the right with slabs embedded in it paralleling the direction of emergence.

Downstream and to the right of extruder 14 is a mold 4 in the form of a thin-walled metal cylinder. The mold is forced against the downstream end of the extruder by a pressure-generating device 16 The mold is coaxial with outlet 9 and screw 7. It is mounted in a device 10 that secures not only mold 4 but other molds 4.1 to 4.3 as well and rotates around an axis 11 paralleling the axis of extruder 14. The individual molds accordingly revolve past the outlet 9 from the extruder and can stop in front of it as desired. The molds in rotating device 10 are all columnar shaped and are charged concentrically with the axis from the left end. As long as this latter condition is ensured, they can also have different cross-sections.

Rotating device 10 is immersed in tub 8 with its axis 11 below the surface of the water. The water can be at room-temperature.

Above the tub 8 and next to the extruder 14 is a receptacle 15 for finished pieces 1, which are in the present case expelled from occupied mold 4.3 by compressed air injected through a nozzle 17 into the mold's right end (in the direction indicated by the arrow 17.1) A stop 18 accurately positions the expelled pieces in receptacle 15. The stop can then be pivoted down around its axis (in the plane of projection) to allow the intercepted piece to enter an assembling device 19—a shipping pallet or something similar.

Figure 3:
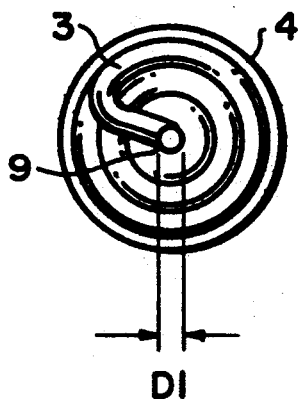
FIG. 3 illustrates the principle involved in introducing the billet into the mold.
Figure 3A:
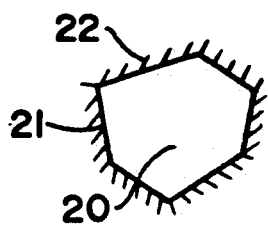
FIG. 3a as an overhead view of a slab.
Figure 4:
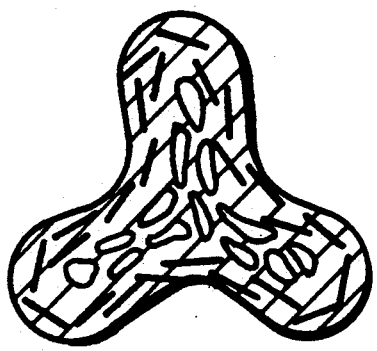
FIGS. 4 through 7 illustrate examples of cross-sections of different columnar shaped pieces obtainable with the method in accordance with the invention.
Figure 5:
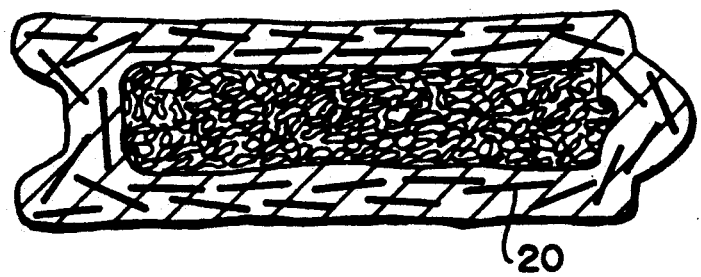
Figure 6:
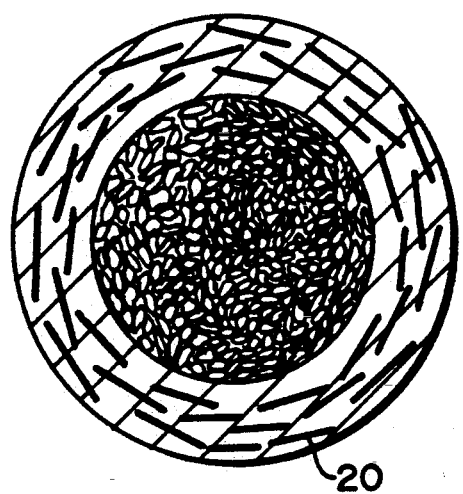
Figure 7:
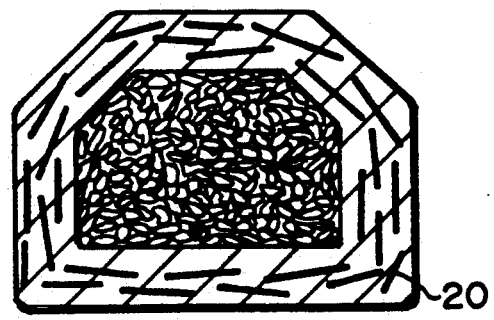

FIG. 3 schematically illustrates how a billet 3 is introduced into a mold 4. Billet 3 arrives through the outlet 9 from extruder 14 rotating around its axis and moving forward toward the center of the downstream end of mold 4, which is surrounded by a rigid inner surface and positioned in stationary relation to outlet 9. Billet 3 is in an easily deformable state and rests subject to gravity initially below outlet 9 against the inner surface of the mold 4, where a certain mutual adhesion between it and the mold 4 occurs due to the billet's adhesive properties. Due to the pressure of additional constituents of the billet 3 as they arrive and revolve around its axis, a deposit will continue to occur along the circumference of the mold 4, resulting in mutual adhesion with inner surface 6 and with the already deposited constituents of the billet 3. The originally available space between the deposited constituents of the billet 3 and outlet 9 will accordingly become completely occupied, and the already deposited constituents will be displaced into still available spaces, creating the initial subsidiary section of the columnar piece. The embedded slabs will surprisingly now all extend parallel to one another and to the axis of piece 1.

The original adhesion against the inner surface 6 of mold 4 will simultaneously be destroyed, and, although new constituents of piece 1 will continually come into existence at the left, the right end of the piece will become increasingly displaced to the right, in the direction indicated by the outlined arrow inside mold 4. This process will continue until mold 4 is completely charged and inner surface is continuously and uniformly covered with constituents of the billet 3. The attainment of this state will be indicated by a sensor 16 that communicates electrically with a switch that, when said state is attained, interrupts the supply of billets and rotates the device 10 around its axis. Hot and charged mold 4 enters the water in tub 8, and charged mold 4.1, which has already been cooled in the water, is positioned for discharging in front of receptacle 15, while another mold, which has already been discharged, is positioned for charging. The extruder 14 can now be engaged again, and the mold 4.3 in the discharging position can be discharged with compressed air from the nozzle 17, introducing the next cycle.

FIGS. 4 through 7 illustrate different inner and outer cross-sections of columnar shaped pieces manufactured with the method and device in accordance with the invention. Characteristic of all these pieces is that, in addition to an almost non-porous zone around the edge with an essentially constant width, they have almost a foam structure at the core. The slabs at the edge are surprisingly all comprised of the hard material and extend parallel to one another and to the axis of the piece. They have a relatively extensive surface and accordingly adhere satisfactorily to the plastic matrix around them even when the two materials are not ideally matched. The pieces are accordingly provided with a skeletal reinforcement by the slabs, which finally dictates their outstanding mechanical strength and satisfactory chemical resistance. The surface consists entirely of constituents of the plastic matrix. It can have any desired texture, which is a significant aesthetic advantage. It can easily be scored to imitate leather or wood. The cross-section can be rectangular, circular, or stellate.

There has thus been shown and described a novel columnar shaped piece and method of manufacturing the same which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method of manufacturing a columnar-shaped piece in which molten thermoplastic is blended with ancillary pieces of a non-creeping material, introduced into a mold and shaped into a piece inside the mold, and thereafter allowed to cool and harden; the improvement wherein the molten thermoplastic is blended with ancillary pieces in the shape of solid slabs (20); wherein the molten thermoplastic with the slabs in it is introduced into one end of the mold (4) in the form of a billet (3) that rotates around a substantially horizontal axis and, inside the mold, is brought into contact with the inner surface (6) thereof in the circumferential direction; wherein the slabs are arranged substantially parallel to the horizontal axis; and wherein the billet continues to be introduced until the inner surface of the mold is continuously and uniformly covered with constituents of the billet.

2. The method defined in claim 1, wherein the billet (3) is rotated by the screw (7) in an extruder (14).

3. The method defined in claim 1, wherein the mold (4) is cooled with an auxiliary coolant once its inner surface (6) is continuously and uniformly covered.

4. The method defined in claim 3, wherein the mold (4) is cooled by dipping it into a tub (8) of water.

* * * * *